United States Patent
Bak et al.

(10) Patent No.: US 10,885,239 B2
(45) Date of Patent: Jan. 5, 2021

(54) GENERATING PSEUDO HEAT MAPS

(71) Applicant: International Business Machines Corporation, Armonk, NY (US)

(72) Inventors: Peter Bak, Yokneam Illit (IL); Jonathan Bnayahu, Haifa (IL); Ido Levy, Koranit (IL); Amir Malki, Yokneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 15/230,419

(22) Filed: Aug. 7, 2016

(65) Prior Publication Data
US 2018/0039717 A1    Feb. 8, 2018

(51) Int. Cl.
*G06F 30/20* (2020.01)
*G06F 111/08* (2020.01)
*G06F 119/08* (2020.01)

(52) U.S. Cl.
CPC .......... *G06F 30/20* (2020.01); *G06F 2111/08* (2020.01); *G06F 2119/08* (2020.01)

(58) Field of Classification Search
CPC ............. G06F 17/5009; G06F 2217/10; G06F 2217/80; G06F 30/20; G06F 2119/08; G06F 2111/08
USPC .......................................................... 703/2
See application file for complete search history.

(56) References Cited

U.S. PATENT DOCUMENTS

| | | | |
|---|---|---|---|
| 9,091,496 B2 | 7/2015 | Imwalle et al. | |
| 9,295,183 B2* | 3/2016 | Bhagwat | H05K 7/20836 |
| 2009/0234613 A1 | 9/2009 | Brey et al. | |
| 2012/0078417 A1 | 3/2012 | Connell, II et al. | |
| 2013/0151191 A1 | 6/2013 | Ranieri et al. | |
| 2013/0166241 A1* | 6/2013 | Hamann | G06Q 10/06 702/99 |
| 2013/0226501 A1* | 8/2013 | Ghosh | H05K 7/20836 702/130 |
| 2014/0320308 A1 | 10/2014 | Lewis | |
| 2015/0338281 A1* | 11/2015 | Ross | G06F 11/3089 236/44 A |
| 2016/0147583 A1* | 5/2016 | Ben Simhon | H04L 43/0823 714/47.3 |
| 2017/0212561 A1* | 7/2017 | Ku | G06F 1/20 |

OTHER PUBLICATIONS

N.M.S Hassan, "Temperature monitoring and CFD analysis of data centre", 2013, Elsevier Ltd. p. 1-9 ["Hassan"] (Year: 2013).*
Jinzhu Chen, "A high fidelity temperature distribution forecasting system for data centers", 2012, IEEE. p. 1-10 ["Chen"] (Year: 2012).*

(Continued)

*Primary Examiner* — Kamini S Shah
*Assistant Examiner* — Faraj Ayoub

(57) ABSTRACT

An example system includes a processor to receive temperature data from a plurality of sensors disposed at locations more sensitive to temperature change in a plurality of server racks. The processor is to also generate a statistical model comprising a continuous spatial statistical distribution of temperature values based on the temperature data. The processor is to further generate a pseudo heat map based on the statistical model.

21 Claims, 7 Drawing Sheets

(56) References Cited

OTHER PUBLICATIONS

"Data Center Thermal Runaway: a review of cooling challenges in high density mission critical environments", 2007, Active Power. p. 2-14 ["ActivePower"] (Year: 2007).*

Kitada et al, "Dynamic power simulator utilizing computational fluid dynamic and machine learning for proposing ask allocation in a data center", 2016, Cloud Computing 2016: The Seventh International Conference on Cloud Computing, GRIDs, and Virtualization ["Kitada"] (Year: 2016).*

Kwok Wu, "A Comparative Study of Various High Density Data Center Cooling Technologies", 2008, Stony Brook university (Year: 2008).*

"Data Center Thermal Runaway: a review of cooling challenges in high density mission critical environments", 2007, Active Power. p. 2-14 ["ActivePower"] (Year: 2007).*

Jinzhu Chen, "A high fidelity temperature distribution forecasting system for data centers", 2012, IEEE. p. 1-10 ["Chen"] (Year: 2012).*

N.M.S Hassan, "Temperature monitoring and CFD analysis of data centre", 2013, Elsevier Ltd. p. 1-9 ["Hassan"] (Year: 2013).*

Thomas Scherer, et al., "Wireless Sensor Network for Continuous Temperature Monitoring in Air-Cooled Data Centers: Applications and Measurement Results", Ad-hoc, Mobile, and Wireless Networks, vol. 7363 of the series Lecture Notes in Computer Science, pp. 235-248, 2012. URL: https://link.springer.com/chapter/10.1007/978-3-642-31638-8_18 (Abstract only).

X. Wang, et al., "Towards Optimal Sensor Placement for Hot Server Detection in Data Centers", Distributed Computing Systems (ICDCS), 2011, 31st International Conference, pp. 899-908, Date of conference: Jun. 20-24, 2011. URL:http://ieeexplore.ieee.org/xpl/articleDetails.jsp?tp=&arnumber=5961766&url=http%3A%2F%2Fieeexplore.ieee.org%2Fxpls%2Fabs_all.jsp%3Farnumber%3D5961766.

M.C. Hao, et al., "Application of Visual Analytics for Thermal State Management in Large Data Centers", Euro graphics/ IEEE-VGTC Symposium on Visualization (2009), pp. 1-8. URL: http://bib.dbvis.de/uploadedFiles/25.pdf.

* cited by examiner

GENERATING PSEUDO HEAT MAPS

BACKGROUND

The present techniques relate to the monitoring of temperature in server rooms. More specifically, the techniques relate to monitoring temperatures by generating heat maps based on temperature data from a number of sensors.

SUMMARY

According to an embodiment described herein, a system can include a processor to receive temperature data from a plurality of sensors disposed at locations more sensitive to temperature change in a plurality of server racks. The processor can also further generate a statistical model including a continuous spatial statistical distribution of temperature values based on the temperature data. The processor can also generate a pseudo heat map based on the statistical model.

According to another embodiment described herein, a method can include receiving, via a processor, temperature data from a plurality of sensors disposed at more sensitive points of a plurality of server racks. The method can also further include generating, via the processor, a continuous spatial statistical distribution model based on the temperature data. The method can also include generating, via the processor, a pseudo heat map based on the continuous spatial statistical distribution model.

According to another embodiment described herein, a computer program product for detection of anomalies using pseudo heat maps can include computer-readable storage medium having program code embodied therewith. The computer readable storage medium is not a transitory signal per se. The program code is executable by a processor to cause the processor to receive temperature data from a plurality of sensors disposed at more sensitive points of a plurality of server racks. The program code can also cause the processor to generate a continuous spatial statistical distribution model based on the temperature data. The program code can also cause the processor to generate a pseudo heat map based on the continuous spatial statistical distribution model. The pseudo heat map is to highlight particular properties of the temperature data. The program code can also cause the processor to monitor the continuous spatial statistical distribution model for temperature anomalies. The program code can also cause the processor to detect a thermal anomaly based on threshold anomaly score being exceeded at server rack. The program code can also cause the processor to also further generate an alert based on the detected thermal anomaly.

DETAILED DESCRIPTION

Figure 1:
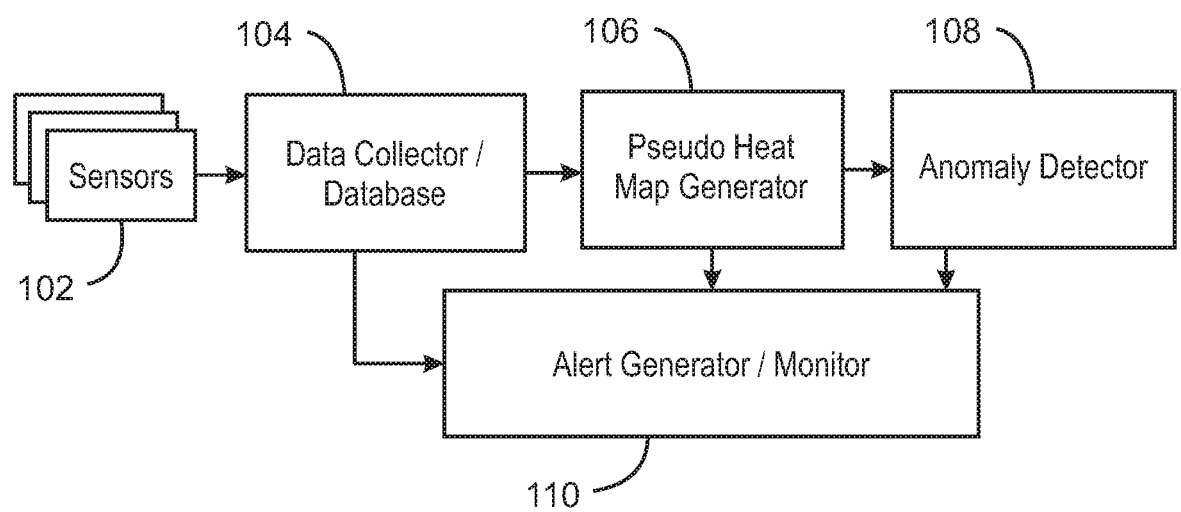
FIG. 1 is a block diagram of an example system that can generate pseudo heat maps.

Data centers may include servers arranged in racks. The racks in the server rooms may be constantly cooled. For example, air-conditioning may be used to generate cold air that flows into the racks. One method may include letting cold air come from the floor on one side of the rack and installing ventilation to pull away the hot air on the other side, creating rows of cold and hot air in the server room that are cooled in part using room ventilation systems that pump cold air in from the floor and push hot air out of the room. A stable server temperature may ensure that the server works efficiently and is not damaged. For example, overheating may cause server damage due to heat expansion of materials, open circuits due to melting of solder, among other reasons. Thus, datacenters typically may have some form of temperature monitoring of real-time temperatures at each server in order to detect overheating issues.

However, once a temperature issue is detected via the real-time temperature sensors, there may be little time to shut down a server in order to prevent damage from overheating. In some examples, there may have already been damage by the time that an alert or notification based on actual temperatures is sent to notify a technician about the problem. Moreover, some root causes of overheating may not be detectable using real-time sensor monitoring based on actual temperatures and thus overheating may only be indirectly detected later in time once significant overheating has occurred. In addition, it may be difficult to detect minor deviations in temperature or predict future temperature changes using heat maps that display real-time actual temperature values from thermal sensors.

According to embodiments of the present disclosure, a system can generate a pseudo heat map from real-time thermal sensor data. As used herein, a pseudo heat map is a heat map with values that do not represent actual temperatures from thermal sensor data, but rather a heat map with a set of values that are used to highlight particular properties of a temperature distribution. The pseudo heat map does not represent actual temperatures in a server room, but rather a set of values that are not physically present that can be used to predict cooling issues in advance. For example, the pseudo heat map may represent a range of values generated from sensors placed at points of weaker air flow within the server racks. In some examples, a continuous spatial statistical distribution model can be generated based on the thermal sensor data. In some examples, kriging may be applied to the thermal sensor data in order to generate the continuous spatial statistical distribution model. The continuous spatial statistical distribution model can then be used to generate the pseudo heat map. For example, an empty pseudo heat map may be generated and locations in the pseudo heat map populated with values from the continuous spatial statistical distribution. The pseudo heat map may then be used for continuous monitoring, more precise decision making and detection of anomalies, prediction of threshold values for alerting, and the replay of event sequences after the event of a disaster, among other possible uses. In some examples, the continuous spatial distribution model or pseudo heat map may be monitored for thermal anomalies. For example, anomaly scores may be calculated for a plurality of locations and a thermal anomaly may be detected when an anomaly score exceeds a threshold score. In some examples, notifications may be sent in response to a thermal anomaly being detected. In some examples, requests may be sent to shut down affected servers or increase overall cooling temporarily. Thus, overheating of servers may be prevented. Furthermore, additional time is gained to shut down servers and request servicing of particular server racks and/or air conditioning equipment. Thus, costs associated with rushed shutdowns and late servicing of air conditioning equipment may be avoided as well. In addition, air flow issues that may have not been detectable by real heat maps may be detected using the present techniques. Moreover, the present techniques may provide for the efficient collection and display of relevant information on air temperature for cooling server racks. For example, the pseudo heat maps may highlight relevant properties of the temperature distribution for decision making and reduce those aspects of the distribution that do not contribute to decision making. Thus, the pseudo maps may simply decision making and reduce unnecessary complexity. Thus, the techniques may thus also save time and resources spent using other methods for determining cooling issues with server racks.

In some scenarios, the techniques described herein may be implemented in a cloud computing environment. As discussed in more detail below in reference to at least FIGS. 4, 5, and 6, a computing device configured to generate pseudo heat maps may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can generate pseudo heat maps. The system is generally referred to using the reference number 100 and can be implemented at least in part using the computing device 300 of FIG. 3 below.

The example system 100 includes a number of sensors 102 to collect temperature information, a database 104 to store temperature information, an anomaly detector 108 to process temperature information, a pseudo heat map generator 106 to generate pseudo heat maps from processed temperature information, and a monitor and alert generator 110 to monitor for detected anomalies and generate alerts.

In the example system 100, the sensors may be strategically placed within server racks. In some examples, the sensors can be disposed at weak points in the server racks based on airflow. For example, the sensors may be disposed in areas of server racks with less air flow and therefore greater sensitivity to fluctuations in heat. For example, the racks may be arranged in such a way that cold and hot rows of air flow are created. In some examples, if an air conditioning system in the server room inserts cold air in the server room from the floor, the sensors may be placed at weak points on the top of the racks. In some examples, if the air conditioning system inserts the cold air from the ceiling of the server room, the sensors can be placed on the bottom of the racks. In some examples, there may be cold and warm aisles between the racks. The actual temperature of the warm aisles may not matter, as long as enough cold air is entering the racks from the cooling side and the warm air is all sucked away by the ventilation. By positioning the sensors at the weak points with regard to cold air flow, the system can assess both that enough cool air is flowing into the racks, and that all the warm air is removed by the ventilation and is not re-entering the racks by mistake.

The system 100 further includes a database 104 to collect information from the sensors 102 and store the temperature information. In some examples, historical temperature information may be saved for later use. For example, the historical temperature information can be used in root cause analysis. In some examples, real-time temperature information can be stored and forwarded for immediate use. For example, the real-time temperature information can be used to generate pseudo heat maps as discussed below.

The system 100 also further includes a pseudo heat map generator 106 that can generate pseudo heat maps. Pseudo, as used herein, refers to not being consistent with actual temperature values on purpose to highlight properties of a temperature distribution that actually matter for decision making and reduce those that aspects of the distribution that do not contribute to the decision making and thus reduce the unnecessary complexity. For example, the pseudo heat map generator can receive the temperature data from the database 104 or directly from the sensors 102. The pseudo heat map generator 106 can generate a continuous spatial statistical distribution model based on the temperature data. For example, the continuous spatial statistical distribution model may be generated using kriging, or any other method of generating continuous spatial statistical distribution models from discrete values. As used herein, kriging refers to a method of interpolation for which the interpolated values are modeled by a Gaussian process governed by prior covariances. The pseudo heat map generator 106 can then generate a pseudo heat map based on the continuous spatial statistical distribution model. For example, pseudo heat map generator 106 may generate a new pseudo heat map with a number of discrete locations. In some examples, each location may be in the shape of a hexagon. In some examples, the discrete locations within the pseudo heat map can be populated with temperature values by applying kriging to the temperature data from the plurality of sensors. The calculated temperature values in the pseudo heat map may not directly correspond to actual temperature values from the thermal sensors in the server racks, but rather include values that emphasis particular attributes of the distribution model. For example, the emphasized attributes may include the sensitivity of an area to airflow changes and the interrelations between different racks. In some examples, an emphasized attribute may be the order in which racks overheat, which can be used to decide an order in which to shut the servers down or enforce backups. In some examples, an emphasized attribute may be hidden problems in air conditioning that may be sensed based on the effects on rack with the least airflow and thus greatest sensitivity to airflow changes. In some examples, the pseudo heat map may be populated with colors based on the calculated temperature values. In some examples, the pseudo heat map may include a nonlinear color palette to increase the visual salience of the pseudo heat map. For example, the color palette may be a diversion color palette having colors ranging from blue to yellow, to orange, to red at higher temperatures. In some examples, the rate of color change in lower temperatures may be linear, while the rate of color change in higher temperatures may be exponential, thus nonlinear. In some examples, lower temperatures may have smaller ranges of temperature specified by colors, while higher temperatures may have larger ranges of temperatures specified by the same colors. For example, a lower range of temperatures in the pseudo heat map may be represented by a larger proportion of colors than a higher range of temperatures in the pseudo heat map. Thus, temperature changes may be more visually salient at the lower temperatures. In some examples, the overall temperature range may be based on historical data or expected values to additionally improve visual salience. In some examples, the pseudo heat map may have a resolution based on the size of the server racks. The resolution of the pseudo heat map may also be based on utilizing available computational power, improving efficiency, and optimizing visual salience of the temperature pattern. In some examples, the pseudo heat map generator 106 can continuously update the pseudo heat map and save successive updated pseudo heat maps as a video for playback after a detected failure event. Thus, a continuous pseudo heat map can be created for an entire server room based on the continuous spatial statistical distribution model obtained through kriging or similar methods. The values depicted in the continuous heat map may not correspond to actual temperature values, but rather be used to detect anomalies and predict future overheating problems before the actual temperature values rise to alerting levels. Thus, the present techniques may be used to provide advance notice of cooling issues.

The system 100 also includes an anomaly detector 108 to monitor the temperature information for anomalies. In some examples, the anomaly detector 108 may assign anomaly scores to various locations. For example, anomaly scores can be calculated as an inverse logarithmic probability of a given temperature for a given rack at a given time. The anomaly detector 108 may then detect a thermal anomaly based on one or more anomaly scores exceeding a predetermined threshold score. In some examples, the anomaly detector 108 may assign anomaly scores to discrete locations within a pseudo heat map generated by the pseudo heat map generator 106 as discussed below.

In some examples, the anomaly detector 108 may detect thermal anomalies using the pseudo heat map based on a threshold anomaly score being exceeded at a server rack. For example, the anomaly detector 108 can monitor the pseudo heat map for anomalies that exceed the threshold anomaly score. In some examples, the anomaly detector 108 can calculate anomaly scores for every location in the pseudo heat map based on a temperature probability. For example, the anomaly scores may be calculated as the inverse logarithmic probability of a given temperature for a given rack at a given time. In some examples, an anomaly score may take the periodic and sequential nature of temporal changes into account in calculating the inverse logarithmic probability. For example, cyclical trends may be included in the calculation of the anomaly scores.

Furthermore, the system 100 also includes an alert generator 110. The alert generator 110 can generate an alert for the server rack based on detected thermal anomalies. For example, a text message or an email can be sent informing one or more technicians about the thermal anomaly. In some examples, a list of server racks affected by the thermal anomaly can be sent along with a list of associated anomaly scores. For example, an air conditioning service technician or any other appropriate individual may receive a text or email with the alert. In some examples, the alert may include affected server racks and their associated anomaly scores.

Figure 2:
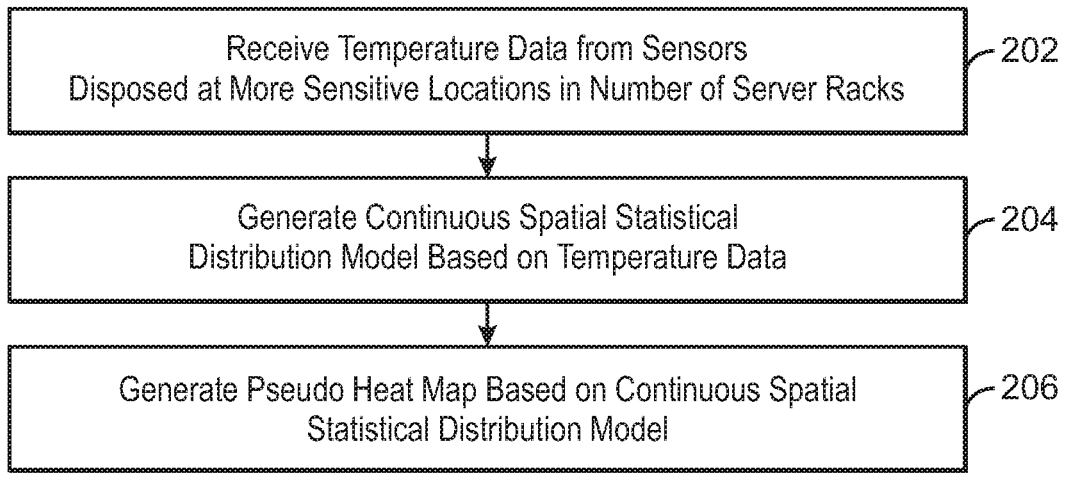
FIG. 2 is a process flow diagram of an example method that can generate pseudo heat maps.

FIG. 2 is a process flow diagram of an example method that can generate pseudo heat maps. The method 200 can be implemented with any suitable computing device, such as the computing device 400 of FIG. 4. For example, the method can be implemented via the processor 402 of computing device 400.

At block 202, the processor receives temperature data from a plurality of sensors disposed at more sensitive locations in a number of server racks. For example, the temperature data may be received from a set of thermal sensors positioned such that efficient information on cold air entering the racks can be collected in real-time. In some examples, the thermal sensors may be positioned at weak points of server racks. For example, the weak points may include locations where cold air is entering the farthest rack from the air conditioning exit, and locations where warm air is eventually entering the first rack when not sucked away from the ventilation. Thus, for example, if the air conditioning is coming from the floor and ventilation is in the ceiling, the positions of the sensors may be at the height of the rack and about 20 cm from the corner away from the ventilation. In some examples, the temperature data may be received from a database of values received from the thermal sensors.

At block 204, the processor generates a continuous spatial statistical distribution model based on the temperature data. The processor may generate the continuous spatial statistic distribution model by extrapolating the temperature data to locations without sensors. For example, the continuous spatial statistical distribution model may be generated by using any suitable technique. For example, the processor may apply kriging to the temperature data to generate the continuous spatial statistical distribution model. In some examples, kriging may thus be applied to the temperature data to form a correlation matrix between discrete locations in the pseudo heat map. Thus, temperature values from the temperature data at the sensors may be extrapolated to calculate temperature values at locations where no sensors exist.

At block 206, the processor generates a pseudo heat map based on the continuous spatial statistical distribution model. For example, a pseudo heat map may be generated with a number discrete locations. In some examples, the discrete locations may be hexagonal in shape. The discrete locations may then be populated with values based on values from the continuous spatial statistical distribution model. In some examples, the processor may generated a hexagon grid in a user-defined manner. For example, all the hexagons may be transparent, and without temperature to begin with. In some examples, the processor may then iterate over all the hexagon cells and use the continuous spatial distribution model to determine the temperature at each cell's location. Thus, each cell may be populated with a temperature within the hexagon. In some examples, the processor may color the hexagon cells with a smart color-palette, which results in a visual image of a continuous heatmap.

In some examples, the processor may update the pseudo heat map in real-time to produce a pseudo heat flow visualization The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
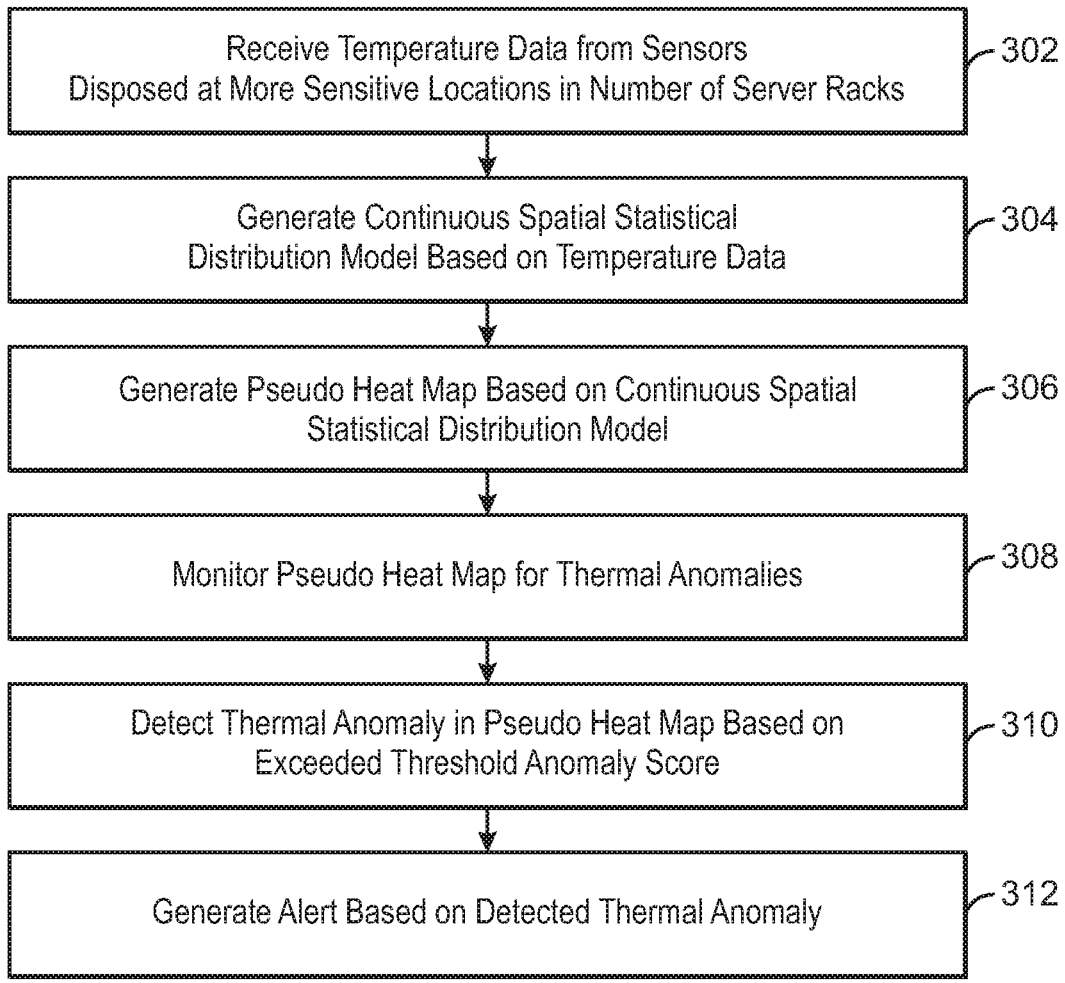
FIG. 3 is a process flow diagram of an example method that can detect thermal anomalies and generate alerts using pseudo heat maps.

FIG. 3 is a process flow diagram of an example method that can detect thermal anomalies and generate alerts using pseudo heat maps. The method 300 can be implemented with any suitable computing device, such as the computing device 400 of FIG. 4. For example, the method can be implemented via the processor 402 of computing device 400.

At block 302, the processor receives temperature data from a plurality of sensors disposed at more sensitive locations in a number of server racks. For example, the temperature data may be received from a set of thermal sensors positioned such that efficient information on cold air entering the racks can be collected in real-time as discussed above with regard to block 202.

At block 304, the processor generates a continuous spatial statistical distribution model based on the temperature data. The processor may generate the continuous spatial statistic distribution model by extrapolating the temperature data to locations without sensors as discussed in greater detail with respect to block 204 above.

At block 306, the processor generates a pseudo heat map based on the continuous spatial statistical distribution model. For example, a pseudo heat map may be generated with a number discrete locations and populated with values based on values from the continuous spatial statistical distribution model as discussed with respect to block 206 above.

At block 308, the processor monitors the continuous spatial distribution model for thermal anomalies. In some examples, a thermal anomaly may be a change in temperature from a set of baseline conditions. For example, the baseline conditions may include periodic (cyclic) and sequential (trends and tendencies) nature of temporal changes into account. In some examples, the processor may generate and monitor anomaly scores for various locations in the continuous spatial statistical distribution model. For example, a greater change in temperature or airflow detected at a given point may result in a larger anomaly score. In some examples, thermal anomalies may correspond to blocked airflows or other sources of overheating.

At block 310, the processor detects a thermal anomaly based on a threshold anomaly score being exceeded. In some examples, anomalies can be measured as an anomaly score calculated based on an inverse logarithmic probability of a given temperature for a given rack at a given time. Thus, the higher an anomaly score, the less probable a temperature is in a given location and time. For example, a temperature of 25 degrees Celsius may be very much expected for one rack, but at the same time highly improbable for another. In some examples, the thermal anomaly may be detected in advance of any server racks exceeding a predetermined temperature threshold. Thus, malfunctions and damage due to overheating may be avoided.

At block 312, the processor generates an alert for the server rack based on the detected thermal anomaly. In some examples, the processor may also determine a location of the detected thermal anomaly based on the heat map and return a list of server racks with associated anomaly scores in the location. In some examples, the processor may also automatically generate a service request for an air conditioning unit based on the detected thermal anomaly. For example, the air conditioning unit may be determined to be a root cause of the detected thermal anomaly.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
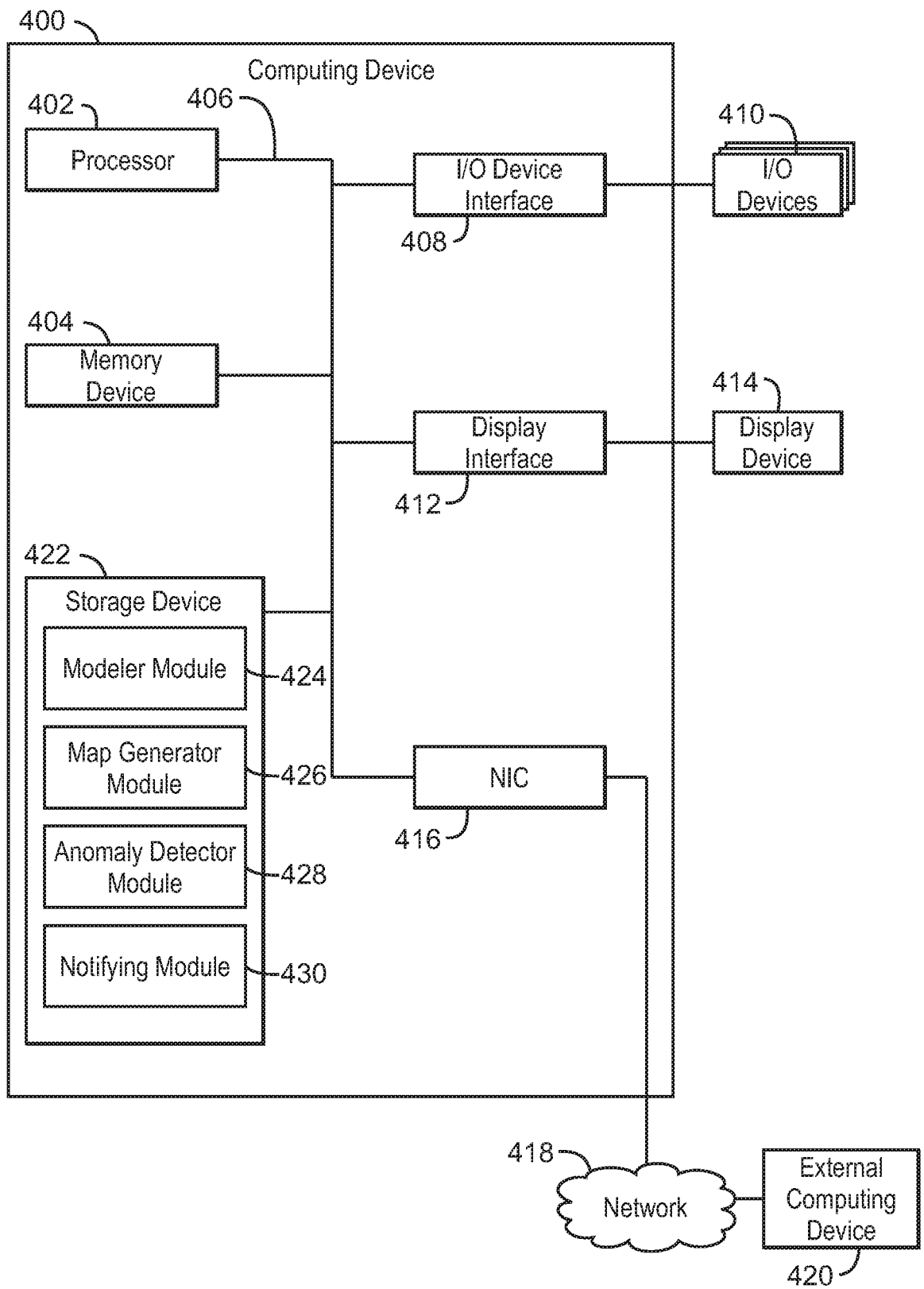
FIG. 4 is a block diagram of an example computing device that can generate pseudo heat maps.

With reference now to FIG. 4, an example computing device can generate pseudo heat maps. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a modeler module 424, a map generator module 426, an anomaly detector module 428, and a notifying module 430. The modeler module 424 can receive temperature data from a plurality of sensors disposed at locations more sensitive to temperature change in a plurality of server racks. In some examples, the sensors can be disposed at locations in the server racks based on airflow. For example, the sensors may be disposed in areas of server racks with less air flow and therefore greater sensitivity to fluctuations in heat. The modeler module 424 can then generate a statistical model including a continuous spatial statistical distribution of temperature values based on the temperature data. For example, the modeler module 424 may use any suitable technique to extrapolate values from the temperature data to produce a continuous spatial distribution of values. For example, the modeler module 424 may apply kriging to the temperature data to generate the continuous spatial statistical distribution model. The modeler module 424 can then generate a pseudo heat map based on a continuous spatial statistical distribution model. An empty pseudo heat map may be first generated with discrete locations to be populated with values. In some examples, the pseudo heat map can be populated by using values from the continuous spatial statistical distribution model to determine temperature values for each discrete location and populate the pseudo heat map with colors based on calculated temperature values. Thus, the pseudo heat map may not directly correspond to actual temperature values from the thermal sensors in the server racks, but rather include values that emphasis particular attributes of the distribution model. In some examples, the pseudo heat map may include a nonlinear color palette to increase the visual salience of the pseudo heat map. For example, the color palette may be a diversion color palette having colors from blue to yellow, to orange, to red at the higher temperatures. In some examples, the rate of color change in lower temperatures may be linear, while the rate of color change in higher temperatures may be exponential, thus nonlinear. In some examples, lower temperatures may have smaller ranges of temperature specified by colors, while higher temperatures may have larger ranges of temperatures specified by the same colors. For example, a lower range of temperatures in the pseudo heat map may be represented by a larger proportion of colors than a higher range of temperatures in the pseudo heat map. Thus, temperature changes may be more visually salient at the lower temperatures. In some examples, the overall temperature range may be based on historical data or expected values to additionally improve visual salience. In some examples, the pseudo heat map may have a resolution based on the size of the server racks. The resolution of the heat map may also be based on utilizing available computational power, improving efficiency, and optimizing visual salience of the temperature pattern. In some examples, the map generator module 426 can continuously update the pseudo heat map and save successive updated pseudo heat maps as a video for playback after a detected failure event. For example, the video can be used for root cause analysis after an detected failure event, such as an overheating of a server rack, is resolved.

The anomaly detector module 428 can detect a thermal anomaly using the pseudo heat map based on a threshold anomaly score being exceeded at a server rack. For example, the anomaly detector module 428 can monitor the pseudo heat map for anomalies that exceed the threshold anomaly score. In some examples, the anomaly detector module 428 can calculate anomaly scores for every location in the pseudo heat map based on temperature probability. For example, the anomaly scores may be calculated as the inverse logarithmic probability of a given temperature for a given rack at a given time. In some examples, an anomaly score may take the periodic and sequential nature of temporal changes into account in calculating the inverse logarithmic probability. For example, cyclical trends may be included in the calculation of the anomaly scores. The notifying module 430 can generate an alert for the server rack based on the detected thermal anomaly. For example, a text message or an email can be sent informing one or more technicians about the thermal anomaly. In some examples, a list of server racks affected by the thermal anomaly can be sent along with a list of associated anomaly scores. As the alert can be sent out before any actual overheating of the server racks is detected, an earlier response can be performed to prevent damage due to overheating.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the modeler module 424, the map generator module 426, the anomaly detector module 428, and the notifying module 430 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the modeler module 424, the map generator module 426, the anomaly detector module 428, and the notifying module 430 can be implemented with logic, wherein the logic, as referred to herein, can include any suitable hardware (e.g., a processor, among others), software (e.g., an application, among others), firmware, or any suitable combination of hardware, software, and firmware.

Figure 5:
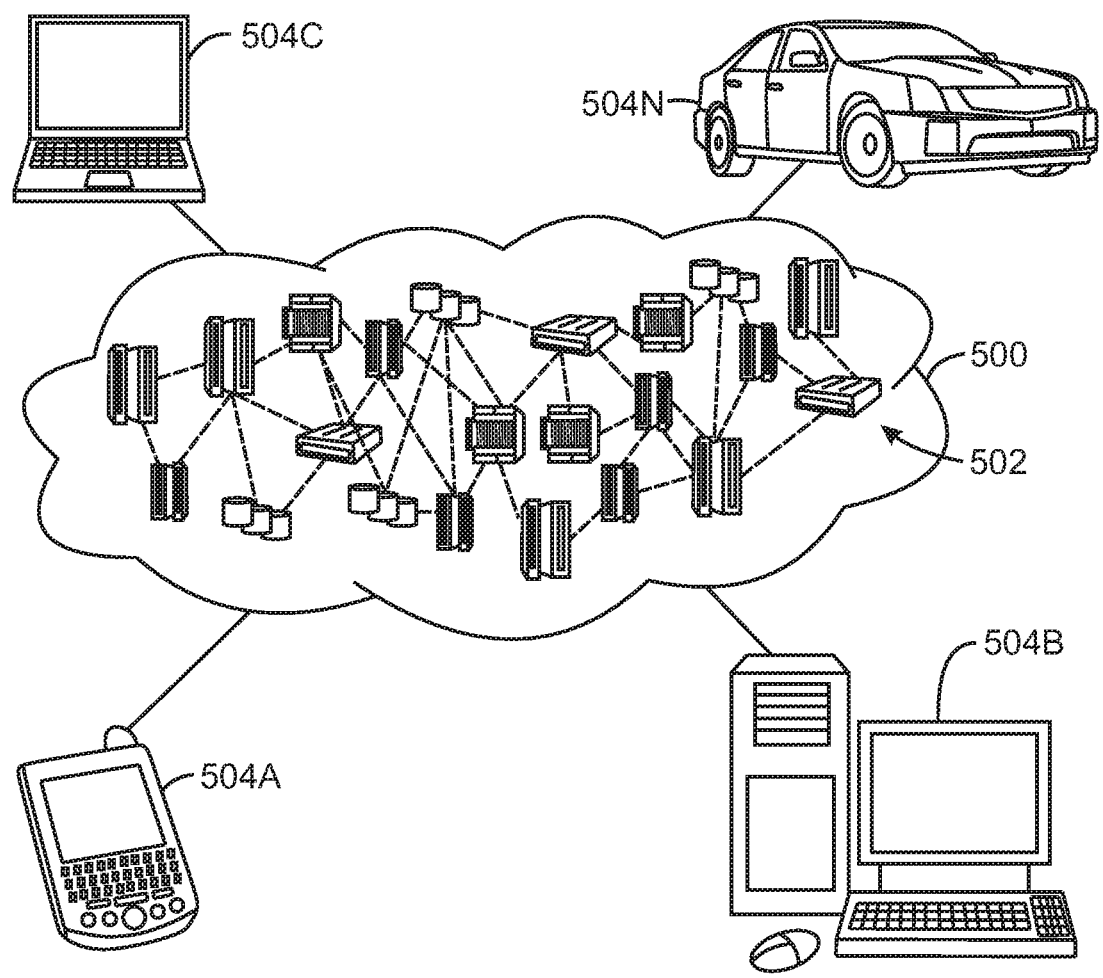
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
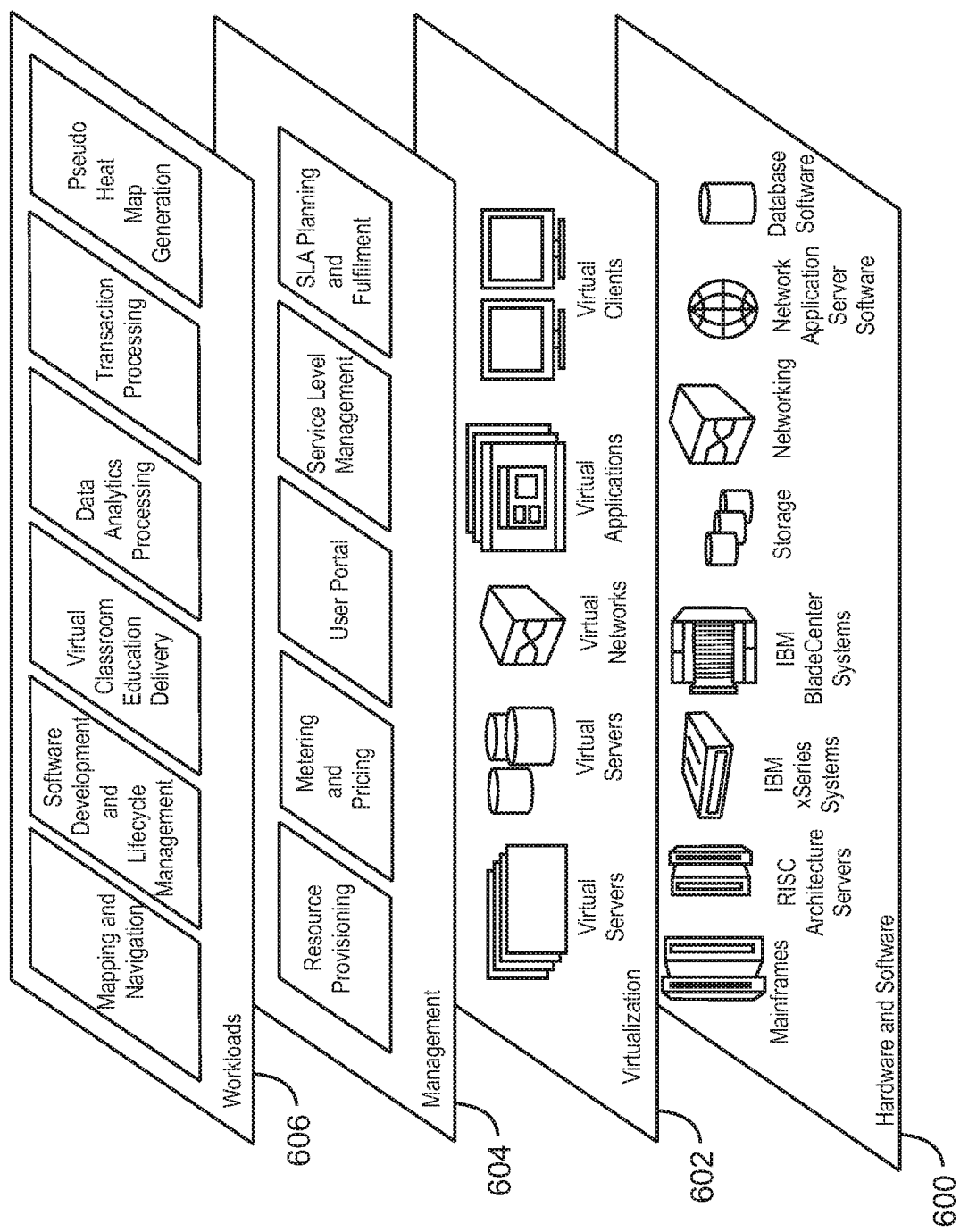
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and pseudo heat map generation.

The present invention may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
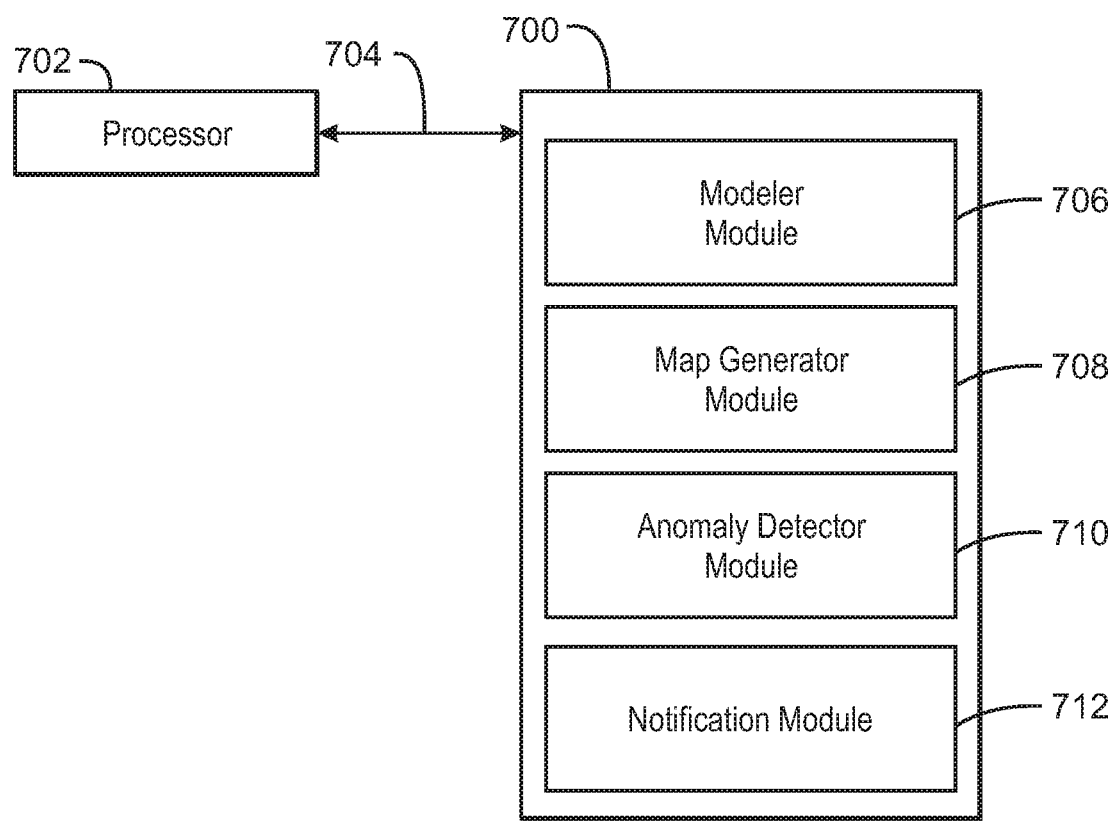
FIG. 7 is an example tangible, non-transitory computer-readable medium that can provide advance detection of temperature anomalies using pseudo heat maps.

Referring now to FIG. 7, a block diagram is depicted of an example tangible, non-transitory computer-readable medium 700 that can provide advance detection of temperature anomalies using pseudo heat maps. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the methods 200 and 300 of FIGS. 2 and 3 above.

The various software components discussed herein may be stored on the tangible, non-transitory, computer-readable medium 700, as indicated in FIG. 7. For example, a modeler module 706 includes code to receive temperature data from a plurality of sensors disposed at more sensitive points of a plurality of server racks. For example, the sensors may be disposed at points with weaker air flow and thus more sensitivity to changes in temperature. The modeler module 706 also includes code to generate a continuous spatial statistical distribution model based on the temperature data. For example, any suitable technique may be used to extrapolate the temperature data to form a continuous spatial statistical distribution model. In some examples, modeler module 706 may generate the continuous spatial statistical distribution model by applying kriging to the temperature data. A map generator module 708 includes code to generate a pseudo heat map based on the continuous spatial statistical distribution model. The pseudo heat map is to highlight particular properties of the temperature data For example, an empty pseudo heat map with discrete locations may be generated. In some examples, map generator module 708 includes code to populate the pseudo heat map with colors based on temperature values from the continuous spatial statistical distribution model. For example, a value can be calculated for each discrete location in the pseudo heat map by applying kriging to the continuous spatial statistical distribution model. In some examples, the map generator module 708 may receive input from an opacity slider and adjust an opacity of the pseudo heat map. For example, the pseudo heat map may be overlayed onto a visual map of a server room. In some examples, the map generator may continuously update the pseudo heat map and save the pseudo heat map as a video for playback after a detected failure event. An anomaly detector module 710 includes code to monitor the continuous spatial distribution model for thermal anomalies. The anomaly detector module 710 also includes code to detect a thermal anomaly based on threshold anomaly score being exceeded at a server rack. In some examples, the anomaly detector may include code to determine a location of the detected thermal anomaly based on the heat map and send a request to shut down a server located in the location. A notification module 712 includes code to generate an alert based on the detected thermal anomaly. In some examples, notification module 712 includes code to determine a location of the detected thermal anomaly based on a pseudo heat map and return a list of server racks with associated anomaly scores in the location. In some examples, the notification module 712 may include code to automatically generate a service request for an air conditioning unit based on the detected thermal anomaly. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
    receive temperature data from a plurality of sensors disposed at temperature-sensitive locations in a plurality of server racks;
    generate a statistical model comprising a continuous spatial statistical distribution of temperature values based on the temperature data;
    generate a pseudo heat map comprising a plurality of discrete locations represented by geometric shapes and emphasizing an attribute of the statistical model, wherein the emphasized attribute comprises an order in which a subset of the plurality of server racks overheats;
    calculate an anomaly score for each of the plurality of discrete locations based on a temperature probability, wherein the anomaly score is calculated as an inverse logarithmic probability of a given temperature for a given rack at a given time; and
    detect a thermal anomaly based on a threshold anomaly score being exceeded at a discrete location, wherein the processor is to determine an order in which to shut down servers in the subset of the plurality of server racks at the discrete location or an order in which to enforce backups of the servers in the subset of the plurality of server racks at the discrete location based on the order in which the subset of the plurality of server racks overheats in the pseudo heat map.

2. The system of claim 1, wherein the statistical model is generated by applying kriging to the temperature data to generate the continuous spatial statistical distribution.

3. The system of claim 1, wherein the plurality of sensors are disposed at the temperature-sensitive locations in the plurality of server racks based on airflow.

4. The system of claim 1, wherein the pseudo heat map comprises a nonlinear color palette to increase a visual salience of the pseudo heat map.

5. The system of claim 1, wherein a first range of temperatures in the pseudo heat map is represented by a larger proportion of colors than a second range of temperatures in the pseudo heat map.

6. The system of claim 1, wherein the pseudo heat map is continuously updated and saved as a video for playback after a detected failure event.

7. A computer-implemented method, comprising:
    receiving, via a processor, temperature data from a plurality of sensors disposed at temperature-sensitive locations in a plurality of server racks;
    generating, via the processor, a continuous spatial statistical distribution model based on the temperature data; and
    generating, via the processor, a pseudo heat map comprising a plurality of discrete locations represented by geometric shapes and emphasizing an attribute of the continuous spatial statistical distribution model, wherein the emphasized attribute comprises an order in which a subset of the plurality of server racks overheats;
    calculating, via the processor, an anomaly score for each of the plurality of discrete locations based on a temperature probability, wherein the anomaly score is calculated as an inverse logarithmic probability of a given temperature for a given rack at a given time; and
    detecting, via the processor, a thermal anomaly based on threshold anomaly score being exceeded at a discrete location, wherein the processor is to determine an order in which to shut down servers in the subset of the plurality of server racks at the discrete location or an order in which to enforce backups of the servers in the subset of the plurality of server racks at the discrete location based on the order in which the subset of the plurality of server racks overheat in the pseudo heat map.

8. The computer-implemented method of claim 7, wherein generating the continuous spatial statistical distribution model further comprises applying kriging to the temperature data.

9. The computer-implemented method of claim 7, comprising updating the pseudo heat map in real-time to produce a pseudo heat flow visualization.

10. The computer-implemented method of claim 7, comprising generating, via the processor, an alert for the server rack based on the detected thermal anomaly.

11. The computer-implemented method of claim 10, comprising determining a location of the detected thermal anomaly based on the pseudo heat map and automatically shutting down a server located in the location.

12. The computer-implemented method of claim 10, wherein the thermal anomaly is detected in advance of any server racks exceeding a predetermined temperature threshold.

13. The computer-implemented method of claim 10, further comprising automatically generating a service request for an air conditioning unit based on the detected thermal anomaly.

14. A computer program product for detection of anomalies using a pseudo heat map, the computer program product comprising a computer-readable storage medium having program code embodied therewith, wherein the computer readable storage medium is not a transitory signal per se, the program code executable by a processor to cause the processor to:

receive temperature data from a plurality of sensors disposed at temperature-sensitive points of a plurality of server racks;

generate a continuous spatial statistical distribution model based on the temperature data;

generate the pseudo heat map comprising a plurality of discrete locations represented by geometric shapes and based on the continuous spatial statistical distribution model, wherein the pseudo heat map is to emphasize an attribute of the continuous spatial statistical distribution model comprising an order in which a subset of the plurality of server racks overheat;

calculate an anomaly score for each of the plurality of discrete locations based on a temperature probability, wherein the anomaly score is calculated as an inverse logarithmic probability of a given temperature for a given rack at a given time;

detect a thermal anomaly based on a threshold anomaly score being exceeded at a server rack, wherein the processor is to determine an order in which to shut down servers in the subset of the plurality of server racks at a discrete location or an order in which to enforce backups of the servers in the subset of the plurality of server racks at the discrete location based on the order in which the subset of the plurality of server racks overheat in the pseudo heat map; and generate an alert based on the detected thermal anomaly and send a request to shut down a server located in the subset of the plurality of server racks.

15. The computer program product of claim 14, further comprising program code executable by the processor to generate the continuous spatial statistical distribution model by applying kriging to the temperature data.

16. The computer program product of claim 14, further comprising program code executable by the processor to populate the pseudo heat map with colors based on calculated temperature values.

17. The computer program product of claim 14, further comprising program code executable by the processor to determine a location of the detected thermal anomaly based on a pseudo heat map and return a list of server racks with associated anomaly scores in the location.

18. The computer program product of claim 14, further comprising program code executable by the processor to automatically generate a service request for an air conditioning unit based on the detected thermal anomaly.

19. The system of claim 1, wherein the pseudo heat map does not represent direct sensor information.

20. The system of claim 1, wherein the processor is to color the geometric shapes with a smart color palette to generate a visual image of a continuous heat map.

21. The method of claim 7, wherein the calculating the inverse logarithmic probability comprises using a periodic or a sequential nature of temporal changes.

* * * * *